United States Patent [19]
Kurokawa et al.

[11] Patent Number: 5,698,317
[45] Date of Patent: Dec. 16, 1997

[54] POLYOLEFIN-BASED LAMINATED FILM

[75] Inventors: Ken Kurokawa, Ibaraki; Nobuo Suzui, Tokyo, both of Japan

[73] Assignee: Toray Industries, Inc., Japan

[21] Appl. No.: 617,068

[22] Filed: Mar. 18, 1996

[30] Foreign Application Priority Data

Mar. 29, 1995 [JP] Japan .................................. 7-097919
Mar. 30, 1995 [JP] Japan .................................. 7-099760

[51] Int. Cl.$^6$ .................................................. B32B 7/12
[52] U.S. Cl. ........................... 428/349; 428/516; 428/461; 428/354
[58] Field of Search ............................ 428/349, 516, 428/461, 347, 517, 354

[56] References Cited

U.S. PATENT DOCUMENTS

| | | | |
|---|---|---|---|
| 4,668,575 | 5/1987 | Schinkel et al. | 428/349 |
| 5,252,384 | 10/1993 | Bothe et al. | 428/349 X |
| 5,436,041 | 7/1995 | Murschall et al. | 428/349 X |
| 5,492,757 | 2/1996 | Schuhmann et al. | 428/349 X |

FOREIGN PATENT DOCUMENTS

| | | |
|---|---|---|
| 1-25503 | 5/1989 | Japan . |
| 2-27940 | 6/1990 | Japan . |
| 3-31347 | 5/1991 | Japan . |
| 5-1138 | 1/1993 | Japan . |

*Primary Examiner*—Daniel Zirker
*Attorney, Agent, or Firm*—Austin R. Miller

[57] ABSTRACT

A polyolefin-based laminate film including at least 4 layers which includes a polyolefin-based resin layer; a polyolefin-based mixed resin layer formed on one surface of the polyolefin-based resin layer of which surface is treated by a discharge treatment, the polyolefin-based mixed resin layer containing at least one of petroleum resins and terpene resins in an amount of 5-30% by weight; a vapor deposited metal layer formed on the discharging-treated surface of the polyolefin-based mixed resin layer; and a heat seal layer formed on the surface of the polyolefin-based resin film opposite the surface on which the polyolefin-based mixed resin layer is formed. The laminate film has excellent moisture-proof and gas-barrier properties, and the rejection rate due to blocking in the production process is low.

21 Claims, 2 Drawing Sheets

5,698,317

1

POLYOLEFIN-BASED LAMINATED FILM

BACKGROUND OF THE INVENTION

1. Field of the Invention

The present invention relates to a polyolefin-based laminate film which excels in moisture-proof and gas-barrier properties, and which is suited for wrapping applications.

2. Description of the Related Art

It is known that gas-barrier and moisture-proof properties of polyolefin films may be promoted by blending a petroleum resin or a terpene resin in a polyolefin such as polypropylene (e.g., Japanese Laid-Open Patent Application (Kokai) No. 1-25503). However, sufficient effects are not obtained by this method alone. To further promote gas-barrier and moisture-proof properties, Japanese Patent Publication (Kokoku) No. 2-27940 discloses a film comprising a vapor-deposited metal layer formed on a polypropylene film containing a petroleum resin or a terpene resin. Japanese Patent Publication (Kokoku) Nos. 3-31347 and 5-1138 disclose films having improved moisture-proof properties, in which the film layer containing a petroleum resin or a terpene resin has a bi-layered structure and is coated with polypropylene or polyvinylidiene chloride resin.

However, if a petroleum resin or a terpene resin is added to polypropylene, since the softening points of petroleum resins and terpene resins are low, the film has a poor dimensional stability and when a laminate film comprising such a film is wound into a roll, roll tightening occurs so that the plainness of the film is deteriorated. Further, since the film has a large heat shrinkage, the stability in processing the film is poor.

The film disclosed in Japanese Patent Publication (Kokoku) No. 2-27940 has a problem that the film shrinks due to heat during vapor-deposition of the metal and so cracks are formed in the vapor-deposited metal layer, so that the gas-barrier and moisture-proof properties are not sufficiently promoted. Further, in cases where a resin such as polyethylene is laminated or coated on the vapor-deposited metal layer, since the adhesion between the vapor-deposited layer and the laminated or coated resin layer is larger than the adhesion between the base film and the vapor-deposited layer, the vapor-deposited layer may be peeled off from the base film, which is problematic.

The films disclosed in Japanese Patent Publication (Kokoku) Nos. 3-31347 and 5-1138 have a problem that cracks are formed in the coating resin layer or adhesion between the polyvinylidene chloride resin and the polypropylene film is reduced since the film shrinks due to heat during the drying step after coating polypropylene or polyvinylidene chloride, so that sufficient moisture-proof properties cannot be obtained.

SUMMARY OF THE INVENTION

Accordingly, an object of the present invention is to provide a polyolefin-based laminate film having improved moisture-proof and gas-barrier properties.

The above-described object may be attained by providing a polyolefin-based laminate film including at least 4 layers, which comprises a polyolefin-based resin layer; a polyolefin-based mixed resin layer formed on one surface of the polyolefin-based resin layer of which surface is treated by discharging, the polyolefin-based mixed resin layer containing at least one material selected from the group consisting of petroleum resins and terpene resins in an amount of about 5–30% by weight; a vapor-deposited metal layer formed on the discharging-treated surface of the polyolefin-based mixed resin layer; and a heat seal layer formed on the surface of the polyolefin-based resin film opposite the surface on which the polyolefin-based mixed resin layer is formed.

With the laminate film according to the present invention, since the heat labile polyolefin-based mixed resin layer subjected to vapor-deposition of the metal is supported by the polyolefin-based resin layer, the base film including the polyolefin-based resin layer and the polyolefin-based mixed resin layer does not shrink by heat exerted on the base film during vapor deposition. Further, since adhesion strength between the vapor-deposited metal and the base film is high, even if the surface of the vapor-deposited metal layer is subjected to laminate processing or other resin layers are laminated thereon, the vapor-deposited metal layer is not peeled off from the base film, so that excellent moisture-proof and gas-barrier properties can be kept.

DETAILED DESCRIPTION OF THE INVENTION

Figure 1:
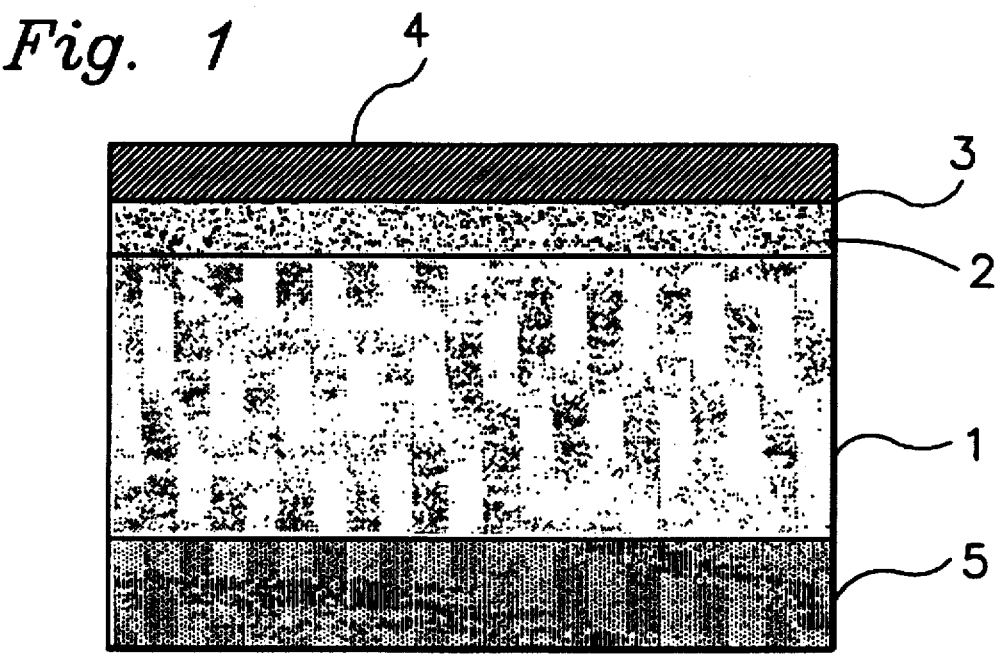
FIG. 1 is a schematic cross-sectional view of the polyolefin-based laminate film according to an embodiment of the present invention.

The following description is intended to refer to the specific embodiments of the invention depicted for illustration in the drawings and is not intended to define or limit the invention other than as in the appended claims.

A polypropylene-based resin film layer is preferred as the polyolefin-based resin layer mentioned above because the cost of production is low. The polypropylene-based film is not restricted and any layer comprising polypropylene as a major constituent may be employed as long as it has a normal dimensional stability (for example, a heat shrinkage not higher than a prescribed value). In this regard, the polyolefin-based resin layer preferably has a thickness of about 10–20 μm. Since this polyolefin-based resin layer is utilized as the base layer of the polyolefin-based laminate film according to the present invention so as to attain good thermal dimensional stability of the entire polyolefin-based laminate film, even if the thicknesses of the polyolefin-based mixed resin layer and the heat seal layer described below are small, good dimensional stability of the overall laminate film can be maintained.

The above-mentioned polyolefin-based mixed resin layer consists essentially of at least one material selected from the group consisting of petroleum resins and terpene resins in a base resin. As the base resin, crystalline polypropylene is preferred. The crystalline polypropylene preferably has an isothermal crystallization time at 125° C. (hereinafter referred to as "t-½") not longer than about 6.5 minutes and an isotactic index (hereinafter referred to as "II") not less than about 94.5% from the view point of increasing the degree of crystallization of the polyolefin-based laminate film to prevent increases in the heat shrinkage in the longitudinal direction and from the view point of resistance to organic solvents. The melt flow index (hereinafter referred to as "MFI") of the crystalline polyolefin may preferably be about 1 g/10 minutes to about 4 g/10 minutes because the dispersion of the petroleum resin and/or terpene resin is good and film-forming and moisture-proof properties are further improved. One or more second components such as ethylene, butene, hexene and the like may be copolymerized. Further, known additives such as nucleating agents, anti-oxidants, thermal stabilizers, lubricants, anti-static agents, anti-blocking agents, fillers, viscosity modifiers, anti-coloring agents and the like may be blended in appropriate amounts.

The petroleum resin mixed in the above-mentioned polyolefin-based mixed resin layer is a resin containing as a major component a cyclopentadiene series hydrocarbon or a higher olefinic hydrocarbon produced from petroleum unsaturated hydrocarbons as immediate starting materials. Hydrogenated resins (hydrogenated petroleum resins) are also included in the definition of the petroleum resin. An especially preferred petroleum resin is polydicyclopentadiene. The hydrogenation rate is not less than about 90%, more preferably not less than 99%, in cases where the resin is hydrogenated.

The glass transition temperature (hereinafter referred to as "Tg") is not lower than 60° C. in view of the thermal dimensional stability during vapor-deposition of the metal. The term "terpene resin" means hydrocarbons having compositions expressed by $(C_5H_8)_n$ and derivatives thereof, wherein "n" means a natural number between 2 and about 20.

Terpene resins are also called terpenoids. Representative examples of terpene resins include pinene, dipentene, carene, myrcene, ocimene, limonene, terepinorene, terpinene, sabinene, tricyclene, bisabolene, zingiberene, santalene, camphorene, mirene, totarene and the like. In the present invention, β-pinene, hydrogenated β-pinene, hydrogenated β-dipentene and the like are especially preferred in view of their compatibility with the polyolefin.

Similar to the petroleum resin mentioned earlier, it is preferred to mix a hydrogenated terpene resin having a hydrogenation rate of not less than about 90%, more preferably not less than about 99% with the base from the view point of further promoting adhesion with the vapor-deposited metal layer formed on the discharging-treated surface of the polyolefin-based mixed resin layer.

In view of the compatibility with the polyolefin, the petroleum resin and the terpene resin described above preferably have a bromine value of not more than 10, more preferably not more than 5, still more preferably not more than 1.

It is required that at least one of the above-described petroleum resins and terpene resins be contained in an amount of about 5–30% by weight in the polyolefin-based mixed resin layer employed in the present invention. The petroleum resins and the terpene resins may be used individually or in combination. If the amount of the above-mentioned resins is less than about 5% by weight, sufficient adhesion between the polyolefin-based mixed resin layer and the vapor-deposited metal is not obtained, so that blocking voids are formed during the vapor-deposition step. On the other hand, if the amount is more than about 30% by weight, extrusion of the resin is unstable so that irregularity in thickness of the obtained polyolefin-based laminate film is observed. If the amount is about 40% by weight, troubles occur in extrusion and it is impossible to form a film. Especially, if the amount of the mixed resin is about 10–20% by weight, the adhesion with the vapor-deposited metal layer is good, so that a polyolefin-based laminate film having excellent gas-barrier property and moisture-proof property, as well as excellent heat resistance can be obtained. The thickness of the polyolefin-based mixed resin layer is preferably about 0.1–5.0 μm.

The surface of the polyolefin-based mixed resin layer is subjected to discharge treatment to promote adhesion with the vapor-deposited metal layer formed on the surface. It is preferred to perform the discharge treatment under a $CO_2$ and/or $N_2$ atmosphere rather than in the air in view of better adhesion with the vapor-deposited metal layer formed thereon. Here, the term "$CO_2$ and/or $N_2$ atmosphere" means atmospheres containing $CO_2$ or $N_2$ individually at not lower than a prescribed concentration, atmospheres containing $CO_2/N_2$ mixed gas at not lower than a prescribed concentration, and atmospheres containing $CO_2/Ar$ mixed gas, $N_2/Ar$ mixed gas or $CO_2/N_2/Ar$ mixed gas at not lower than a prescribed concentration.

In the present invention, the term "vapor-deposited metal layer" means the metal layer formed by a known metallizing method such as vacuum evaporation method or sputtering method. The metal constituting the metal layer may be Al, Zn, Ni, Cr, Co, Fe, Au, Pa and the like as well as alloys thereof. In view of economy and good adhesion with the polyolefin-based mixed resin layer, Al, Zn and Ni are preferred.

By setting the thickness of the vapor-deposited metal layer to about 5–60 nm, the gas-barrier properties of the polypropylene-based laminate film according to the present invention are prominently promoted and the laminate film, coupled with the excellent moisture-proof properties, is suited for the uses for wrapping dry stuffs, potato chips and the like. The gas-barrier properties tend to be reduced if the thickness is less than about 5 nm. The polyolefin-based mixed resin layer is partially shrunken by heat from the vapor-deposited metal layer if the thickness is more than about 60 nm, so that the plainness of the film may be deteriorated and the adhesion strength with the polyolefin-based mixed resin layer is decreased. Thus, the metal layer may easily be peeled off and blocking may occur in winding the film.

In the present invention, the heat seal layer may be any heat seal layer so long as the initiation temperature of heat sealing is about 80°–130° C. and so long as it is suited for wrapping processing. The heat seal layer may be formed by (1) simultaneous extrusion with the polyolefin-based resin layer and the polyolefin-based mixed resin layer; or (2) by lamination after producing the polyolefin-based resin layer and the polyolefin-based mixed resin layer.

The heat seal layer may preferably consist essentially of a binary or ternary copolymer between polypropylene and one or more other polymers in cases where the heat seal layer is formed by (1) simultaneous extrusion with the polyolefin-based resin layer and the polyolefin-based mixed resin layer. A specific example of the copolymer is the ternary copolymer of ethylene/propylene/butene. The thickness of the heat seal layer is not restricted and may preferably be about 0.5–5.0 μm.

In this case, the heat seal layer may preferably contain as an anti-blocking agent an inorganic lubricant such as spherical silica or irregular silica (SYLOID), or spherical silicone resin particles and the like in an amount of about 0.05–0.5% by weight. The rejection rate due to blocking can be reduced and reduction of the deposition strength and formation of voids in the vapor-deposited layer can be prevented if an anti-blocking agent is contained in the heat seal layer.

To inhibit blocking, it is especially preferred to adjust the slip factor μs/μd (static friction coefficient/kinetic friction coefficient) between the heat seal layers to about (0.4–0.9)/(0.3–0.8).

In cases where the heat seal layer is formed by (2) lamination after producing the polyolefin-based resin layer and the polyolefin-based mixed resin layer, a heat seal resin such as polyethylene or ionomer (SURLYN) is extrusion-laminated on the side of the polyolefin-based resin layer of a preliminarily formed film comprising the polyolefin-based resin layer and the polyolefin-based mixed resin layer, thereby obtaining the polyolefin-based laminate film according to the present invention. In this case, the thickness of the heat seal layer is preferably about 5–30 μm in view of the strength of the heat seal layer. An additional polyolefin resin layer may be formed between the heat seal layer and the polyolefin-based resin layer.

In cases where the additional polyolefin resin layer is formed, the surface thereof should be treated by corona discharge. The atmosphere in which the corona discharge treatment is performed is not restricted and it can be performed in air. The corona discharge treatment is preferably performed to attain a wetting tension of the surface of the film of 35–45 dynes. By virtue of the corona discharge treatment, the heat seal resin may be extrusion-laminated onto the surface or printing can be performed on the surface.

The above-mentioned additional polyolefin resin layer may preferably have a slip factor μs/μd of about (0.15–0.5)/(0.15–0.5). If the slipperiness of this layer is poor, blocking tends to occur during vapor-deposition of the metal.

Examples of the layer having the above-mentioned slip factor include layers made of block copolymers of polypropylene and one or more other polymers whose surfaces are roughened and matted during film-formation; and layers made of polypropylene containing an anti-blocking agent such as spherical silica, SYLOID, spherical silicone resin particles or the like in an amount of about 0.05–0.5% by weight. The thickness of this layer is preferably about 0.1–5.0 μm.

By providing the additional polyolefin-based resin layer between the polyolefin-based resin layer and the heat seal layer, and by making the thickness of the heat seal layer large, a film having a high heat seal strength can be obtained. The anti-blocking property can be further promoted if the additional polyolefin-based resin layer is a matte layer.

The polyolefin-based laminate film according to the present invention may suitably be used for wrapping uses after laminating a polyethylene-based film layer on the surface of the vapor-deposited metal layer and forming a biaxially oriented polypropylene-based film thereon. Printing may be performed on the surface of the biaxially oriented polypropylene-based film, which surface contacts the polyethylene-based film.

The polyethylene-based film layer may consist essentially of, for example, polyethylene or mixtures of polyethylene/ethylene methyl acrylate or polyethylene/ethylene methyl methacrylate.

The polyolefin-based laminate film according to the present invention preferably comprises polypropylene as the major component because the production cost is low. The mode of stretching the film is not restricted and so the film may not be stretched (non-oriented), uniaxially stretched (uniaxially oriented) or biaxially stretched (biaxially oriented). In view of strength and dimensional stability, biaxially stretched (biaxially oriented) films are especially preferred for wrapping uses and the like.

A preferred example of the process for producing the polyolefin-based laminate film according to the present invention will now be described.

A resin A which is a crystalline polyolefin such as crystalline polypropylene having a t-½ at 125° C. of not more than about 6.0 minutes, an II of not less than about 94.5%, and a MFI of about 1–4 g/10 minutes, which contains at least one of petroleum resins and terpene resins in an amount of about 5–30% by weight, is supplied to an extruder A and melt-extruded at a resin temperature of not lower than 200° C., preferably 220°–290° C. Simultaneously, polypropylene resin B is supplied to an extruder B and extruded at a resin temperature of 240°–320° C. Further, a resin C for forming the heat seal layer, such as ternary copolymer of ethylene/propylene/butene which may comprise an anti-blocking agent in a prescribed amount is supplied to an extruder C and extruded at a resin temperature of 240°–320° C. After passing through a filter, the extruded resins A, B and C are laminated by a three-layered compositing die and extruded as a three-layered laminate sheet having a structure of A/B/C layers. The three-layered laminate sheet is cast onto a cooling drum whose surface temperature is controlled to 20°–60° C. to solidify the sheet, thereby obtaining a non-oriented laminate film.

The non-oriented laminate film is stretched in the longitudinal direction at about 135°–165° C. at a stretching ratio of about 4.0–5.0 times the original length and the resultant is cooled to about 15°–50° C. to obtain a uniaxially oriented laminate film. Then the uniaxially oriented laminate film is introduced into a tenter and preliminarily heated to 130°–180° C. The laminate film is then stretched in the transverse direction at a stretching ratio of about 7~12 times the original length and then heat set. The surface of the layer A of the obtained biaxially oriented laminate film is subjected to corona discharge treatment in an atmosphere of $CO_2$, $N_2$ or a mixture thereof and the resultant is wound. As required, the wound film is subjected to aging treatment and then slit into a prescribed width. A metal such as aluminum is vapor-deposited on the surface of the layer A to obtain a polyolefin-based laminate film comprising 4 layers, i.e., A, B and C layers and the vapor-deposited aluminum layer.

Methods for Measuring Characteristics and for Evaluating Effects

The methods for measuring characteristics and for evaluating effects concerning the present invention are as follows;

(1) Isotactic Index (II)

The isotactic indices of the starting materials can be measured individually. In case of composite films, the sample is extracted with n-heptane at not higher than 60° C. for 2 hours to remove additives contained in the polyolefin such as polypropylene. The resultant is then dried in a vacuum at 130° C. for 2 hours. A part having a weight of W (mg) of the resultant is sampled and extracted with boiling n-heptane for 12 hours in a Soxhlet extractor. The resulting sample is washed with acetone and dried in a vacuum for 6 hours at 130° C. The sample is then cooled to room temperature and the weight W' (mg) thereof is measured. The isotactic index (II) is calculated according to the following equation:

$$II(\%)=(W/W')\times 100$$

The isotactic index of composite layers can be measured by shaving off the surface layer and measuring the isotactic index as described above.

(2) Glass Transition Temperature (Tg) and Isothermal Crystallization Time (t-½)

The glass transition temperature and the isothermal crystallization time of the starting materials can be measured individually. In the case of composite films, the sample is extracted with n-heptane at not higher than 60° C. for 2 hours to separate the polyolefin such as polypropylene from the petroleum resins and terpene resins. The separated polypropylene is dried in a vacuum for 2 hours at 130° C. On the other hand, the separated petroleum resins and the terpene resins are dried in a vacuum for 2 hours at 60° C. Each sample having a weight of 5 mg is heated at a rate of 20° C./min. by a differential scanning calorimeter (DSC-2 type, commercially available from PERKIN ELMER). The temperature at which the specific heat is changed due to secondary transition is defined as the glass transition temperature (Tg). The sample is further heated to the melt-keeping temperature, 280° C., and kept at this temperature for 5 minutes. Thereafter, the sample is cooled at a rate of 20° C./min. and kept at 125° C. During this process, the time points at which the peak of latent heat due to crystallization starts and ends, respectively, are recorded, and the half of the time period between the recorded time points is defined as the isothermal crystallization time (t-½).

The glass transition temperature and the isothermal crystallization time of composite layers can be measured by shaving off the surface layer and measuring the glass transition temperature and the isothermal crystallization time as described above.

(3) Melt Flow Index (MFI)

Melt flow index is measured in accordance with ASTM-D-1238 at 230° C. and at 2.16 kg.

(4) Bromine Value

Bromine value is measured in accordance with JIS-K2543-1979 which is hereby incorporated by reference. Bromine value is expressed in terms of grams of bromine added to unsaturated components in 100 g of sample oil.

(5) Heat Shrinkage Rate

A film having a gauge length of 260 mm and a width of 10 mm is sampled and the position at 200 mm (original length $L_0$) from the lower end of the sample is marked. A load of 3 g is applied to the lower end of the sample and the sample is heated at 120° C. for 15 minutes in an oven, followed by measuring the length ($L_1$) between the marked position and the lower end of the sample. Heat shrinkage rate (R) is calculated according to the following equation:

Heat Shrinkage Rate (R) (%)=$[(L_0-L_0)/L_0]\times 100$ (6) Film Thickness

Thickness of a film is measured in accordance with JIS-B7509, which is hereby incorporated by reference, using a dial gauge type thickness meter.

(7) Thicknesses of Laminated Layers

Thicknesses of laminated layers are measured by observing the structure of the cross section of the laminated film with a field emission scanning electron microscope.

(8) Slip Factor µs/µd

Slip factor is measured in accordance with ASTM-D1894-93.

(9) Peel Strength of Vapor-deposited Metal Layer

On the surface of a vapor-deposited metal layer such as vapor-deposited Al layer, SURLYN is heat sealed (120° C.×1 second). The SURLYN layer is peeled off from the metallized film at a direction of 180° at a peeling rate of 300 m/min. and the peel strength is measured. The unit of the peel strength is g/inch of sample width and not less than 300 g/inch is evaluated to be acceptable in the present invention.

(10) Oxygen Transmittance ($O_2$ TR)

In the present invention, the gas-barrier property is evaluated in terms of oxygen transmittance (hereinafter referred to as "$O_2$ TR") and the oxygen transmittance (unit: cc/100 inch²/day) is measured in accordance with ASTM 3985 using a commercially available oxygen transmittance measuring apparatus (commercially available from MOCON). In the present invention, $O_2$ TR of not more than 2 cc/100 in²/day is evaluated to be acceptable and of not more than 1.5 cc/100 in²/day is evaluated to be preferable.

(11) Test of Blocking

Metallized film such as Al-metallized film is unwound from the vapor-deposition reel and sizes and the number of pinholes in the surface of the vapor-deposited metal layer are compared with those of an evaluation sample by visual observation, thereby performing a pass-fail test. The rejection rate in total products is defined as the rejection rate (%) due to blocking. In the present invention, a rejection rate of not higher than 1.5% is evaluated to be acceptable.

The present invention will now be described by way of examples and comparative examples.

EXAMPLE 1

FIG. 1 is a schematic cross-sectional view of a polyolefin-based laminate film of Example 1 according to an embodiment of the present invention. In FIG. 1, reference number 1 denotes a polyolefin-based resin layer, reference number 2 denotes a polyolefin-based mixed resin layer, reference number 3 denotes the surface treated by discharging, reference number 4 denotes a vapor-deposited metal layer, and reference number 5 denotes a heat seal layer.

This polyolefin-based laminate film comprises a polyolefin-based resin layer (hereinafter referred to as "layer B") 1, a polyolefin-based mixed resin layer (hereinafter referred to as "layer A") 2 laminated on one surface of the layer B 1, a vapor-deposited metal layer 4 formed on the layer A 2 on the side 3 treated by discharging, and a heat seal layer (hereinafter referred to as "layer C") 5 formed on the other side of the layer B 1.

The process for producing the polyolefin-based laminated film according to this example will now be described concretely.

A resin for forming the layer A containing 85% by weight of a crystalline polypropylene (t-½: 4.5 minutes, II: 95.5%, MFI: 1.7 g/10 minutes) and 15% by weight of hydrogenated polydicyclopentadiene which is a petroleum resin was supplied to an extruder A and melted at 255° C. A usual polypropylene as the resin for forming layer B was supplied to an extruder B and melted at 280° C. A butene/polypropylene/ethylene ternary copolymer which is a polypropylene-based resin containing 0.4% by weight of spherical silicone resin particles as an anti-blocking agent was supplied to an extruder C and melted at 270° C.

Each of the melted resins was fed to a three-layered composite die after passing through filters and extrusion-laminated to attain a three-layered structure of A/B/C layers. The extruded laminate sheet was cooled on a cooling drum having a surface temperature of 30° C., thereby solidifying the resin. The obtained non-oriented film (sheet) was preliminarily heated to 150° C and stretched in the longitudinal direction at a stretching ratio of 4.3 times the original length followed by cooling to 30°–40° C. The obtained uniaxially oriented film was supplied to a tenter and preliminarily heated at 160° C. The film was then stretched in the transverse direction at a stretching ratio of 10 times the original length and then heat set. The surface of the layer A of the obtained biaxially oriented laminate film was subjected to corona discharge treatment in an atmosphere of $CO_2/N_2$ mixed gas and the resulting film was wound. On the surface treated by the corona discharge, Al was vapor-deposited to a thickness of 30–40 nm in a vacuum having a degree of vacuum of $10^{-4}$–$10^{-5}$ and the resulting metallized film was wound. The thickness of the each layer, $O_2$ TR rejection rate due to blocking and peel strength of the vapor-deposited Al layer of the obtained film are shown in Table 1.

As is apparent from Table 1, all of the $O_2$ TR rejection rate due to blocking and peel strength of the Al layer of the film were excellent.

EXAMPLE 2

A laminate film was produced in the same manner as in Example 1 except that the corona discharge treatment was performed in air. The $O_2$ TR rejection rate due to blocking and peel strength of the vapor-deposited Al layer of the obtained film are shown in Table 1. Although each value was not quite as good as Example 1, the characteristics were sufficiently satisfactory.

EXAMPLES 3 AND 4

Laminate films were produced in the same manner as in Example 1 except that the amount of the hydrogenated polydicyclopentadiene was 10% by weight (Example 3) or 25% by weight (Example 4). The $O_2$ TR rejection rate due to blocking and peel strength of the vapor-deposited Al layer of each of the obtained films are shown in Table 1. Although the $O_2$ TR and the rejection rates due to blocking of the obtained films were not quite as good as those of the film produced in Example 1, the characteristics were sufficiently satisfactory.

Comparative Example 1

A laminate film was produced in the same manner as in Example 1 except that the amount of the hydrogenated polydicyclopentadiene was 3% by weight. The $O_2$ TR rejection rate due to blocking and peel strength of the vapor-deposited Al layer of the obtained film are shown in Table 1. The peel strength of the vapor-deposited Al layer was low and the rejection rate due to blocking was high, so that a film which can be practically used was not obtained.

Comparative Examples 2 and 3

Laminate films were produced in the same manner as in Example 1 except that the amount of the hydrogenated polydicyclopentadiene was 35% by weight (Comparative Example 2) or 40% by weight (Comparative Example 3). In Comparative Example 2, the extrusion in the film-forming process was unstable and so irregularity in thickness occurred. In Comparative Example 3, troubles occurred in extrusion so that a film could not be formed.

rate due to blocking was high and the peel strength of the vapor-deposited Al layer was low so that the film could not be practically used. The corona discharge treatment was performed on the surface of the layer B.

Comparative Example 5

A laminate film was produced in the same manner as in Example 1 except that the corona discharge treatment was not performed. The $O_2$ TR rejection rate due to blocking, and peel strength of the vapor-deposited Al layer of the obtained film are shown in Table 2. As is apparent from Table 2, the film cannot be practically used at all.

TABLE 1

| | Thickness (μm) | | | Mixed Resin | Anti-blocking | Corona Discharge | $O_2$ TR (cc/100 | Rejection Rate due to | Peel Strength of Deposited | |
|---|---|---|---|---|---|---|---|---|---|---|
| | Layer A | Layer B | Layer C | (wt %) | Agent | Treatment | in²/day) | Blocking (%) | Al Layer (g/inch) | Note |
| Example 1 | 0.5 | 15.8 | 1.5 | 15 | *1 | *2 | 0.68 | 0.4 | 510 | |
| Example 2 | 0.5 | 15.8 | 1.5 | 15 | *1 | in the air | 0.8 | 0.8 | 370 | |
| Example 3 | 0.5 | 15.8 | 1.5 | 10 | *1 | *2 | 1.03 | 0.9 | 390 | |
| Example 4 | 0.5 | 15.8 | 1.5 | 25 | *1 | *2 | 0.75 | 0.5 | 570 | |
| Comparative Example 1 | 0.5 | 15.8 | 1.5 | 3 | *1 | *2 | 1.24 | 4.2 | 180 | |
| Comparative Example 2 | 0.5 | 15.8 | 1.5 | 35 | *1 | *2 | — | — | — | *3 |
| Comparative Example 3 | 0.5 | 15.8 | 1.5 | 40 | *1 | — | — | — | — | *4 |

*1: Spherical Silicone Resin Particles
*2: $CO_2/N_2$ atmosphere
*3: Irregularity in thickness occurred due to unstable extrusion.
*4: Film could not be formed due to troubles in extrusion.

Comparative Example 4

A laminate film was produced in the same manner as in Example 1 except that the laminate film did not have the

TABLE 2

| | Thickness (μm) | | | Mixed Resin | Anti-blocking | Corona Discharge | $O_2$ TR (cc/100 | Rejection Rate due to | Peel Strength of Deposited | |
|---|---|---|---|---|---|---|---|---|---|---|
| | Layer A | Layer B | Layer C | (wt %) | Agent | Treatment | in²/day) | Blocking (%) | Al Layer (g/inch) | Note |
| Comparative Example 4 | — | 16.3 | 1.5 | — | *1 | *2 | 1.15 | 9.6 | 150 | |
| Comparative Example 5 | 0.5 | 15.8 | 1.5 | 15 | *1 | — | 21.5 | 100 | 50 or less | |

*1: Spherical Silicone Resin Particles
*2: $CO_2/N_2$ atmosphere layer A and so had a bi-layer structure of B/C layers. To the heat seal layer (layer C), 0.4% by weight of spherical silicone resin particles were added as an anti-blocking agent. The $O_2$ TR rejection rate due to blocking and peel strength of the vapor-deposited Al layer of the obtained film are shown in Table 2. As is apparent from Table 2, the rejection

EXAMPLES 5–7

Laminate films were produced in the same manner as in Example 1 except that a dipentene resin which is a terpene resin was used in place of the hydrogenated polydicyclopentadiene which is a petroleum resin in an amount of 10% by weight (Example 5), 15% by weight (Example 6) or 25% by weight (Example 7). The $O_2$ TR rejection rate due to blocking and peel strength of the vapor-deposited Al layer of the obtained film are shown in Table 3. As shown in Table 3, all of these properties of the films were excellent.

EXAMPLES 8–10

Laminate films were produced in the same manner as in Example 1 except that a mixture of β-pinene and dipentene which are terpene resins (mixing ratio: 50:50) was used in place of the hydrogenated polydicyclopentadiene in an amount of 10% by weight (Example 8), 15% by weight (Example 9) or 25% by weight (Example 10). The $O_2$ TR rejection rates due to blocking and peel strength of the vapor-deposited Al layer of the obtained film are shown in Table 3. As shown in Table 3, all of these properties of the films were excellent.

the layer A was performed in the air. The $O_2$ TR rejection rate due to blocking and peel strength of the vapor-deposited Al layer of the obtained film are shown in Table 4. Although each value was not quite as good as that in Example 11, the characteristics were sufficiently satisfactory.

EXAMPLES 13 AND 14

Laminate films were produced in the same manner as in Example 11 except that the amount of the hydrogenated polydicyclopentadiene was 10% by weight (Example 13) or 25% by weight (Example 14). The $O_2$ TR rejection rate due to blocking and peel strength of the vapor-deposited Al layer of each of the obtained films are shown in Table 4. Although the $O_2$ TR and the rejection rates due to blocking of the obtained films were not quite as good as those of the film produced in Example 11, the characteristics were sufficiently satisfactory.

TABLE 3

| | Thickness (μm) | | | Mixed Resin | Anti-blocking | Corona Discharge | $O_2$ TR (cc/100 | Rejection Rate due to | Peel Strength of Deposited | |
|---|---|---|---|---|---|---|---|---|---|---|
| | Layer A | Layer B | Layer C | (wt %) | Agent | Treatment | in²/day) | Blocking (%) | Al Layer (g/inch) | Note |
| Example 5 | 0.5 | 15.8 | 1.5 | 10 | *1 | *2 | 1.05 | 0.7 | 410 | |
| Example 6 | 0.5 | 15.8 | 1.5 | 15 | *1 | *2 | 0.97 | 0.9 | 440 | |
| Example 7 | 0.5 | 15.8 | 1.5 | 25 | *1 | *2 | 0.88 | 0.6 | 560 | *3 |
| Example 8 | 0.5 | 15.8 | 1.5 | 10 | *1 | *2 | 1.14 | 1.1 | 330 | |
| Example 9 | 0.5 | 15.8 | 1.5 | 15 | *1 | *2 | 1.11 | 0.7 | 410 | |
| Example 10 | 0.5 | 15.8 | 1.5 | 25 | *1 | *2 | 1.06 | 1.0 | 450 | |

*1: Spherical Silicone Resin Particles
*2: $CO_2/N_2$ atmosphere
*3: Small irregularity in thickness occurred due to unstable extrusion.

EXAMPLE 11

Figure 2:
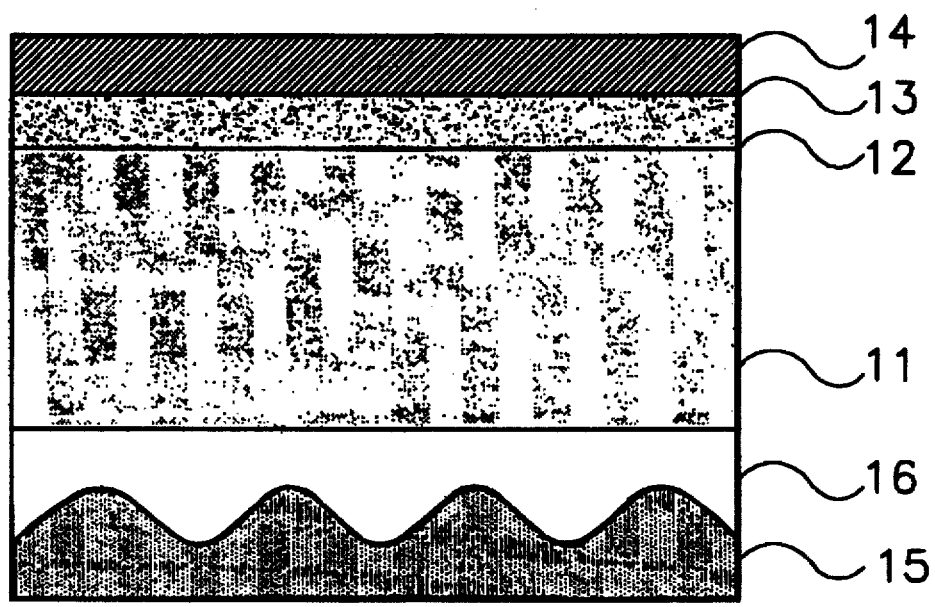
FIG. 2 is a schematic cross-sectional view of the polyolefin-based laminate film according to another embodiment of the present invention.

In the process of Example 1, a block copolymer containing 20% by weight of polyethylene and 80% by weight of polypropylene as a resin for forming a matte layer was supplied to the extruder C in place of the resin for forming the layer C. The same procedure as in Example 1 was followed to obtain a biaxially oriented and heat set laminate film. The surface of the layer made of the above-mentioned block copolymer was roughened to matte the surface, thereby preparing a matte layer. The surface of this matte layer was subjected to corona discharge treatment in the air and the surface of the layer A was subjected to corona discharge treatment in $CO_2/N_2$ atmosphere. A metal layer was vapor-deposited on the surface of the layer A in the same manner as in Example 1, and polyethylene was extrusion-laminated at 280°–320° C. on the surface of the matte layer to form a heat seal layer, thereby obtaining a composite film. Cross-sectional view of the thus obtained film is shown in FIG. 2. In FIG. 2, reference number 11 denotes a polyolefin-based resin layer, reference number 12 denotes a polyolefin-based mixed resin layer, reference number 13 denotes the surface treated by discharging, reference number 14 denotes a vapor-deposited metal layer, reference number 15 denotes a heat seal layer, and reference number 16 denotes a matte layer. The $O_2$ TR rejection rate due to blocking and peel strength of the vapor-deposited Al layer of the obtained film are shown in Table 4.

As is apparent from Table 4, all of these properties of the film were excellent.

EXAMPLE 12

A laminate film was produced in the same manner as in Example 11 except that the corona discharge treatment of

EXAMPLES 15 AND 16

Laminate films were produced in the same manner as in Example 11 except that dipentene resin (Example 14) which is a terpene resin or a mixture (50:50) of β-pinene and dipentene which are terpene resins (Example 15) was used in place of the hydrogenated polydicyclopentadiene. The $O_2$ TR rejection rate due to blocking and peel strength of the vapor-deposited Al layer of each of the obtained film are shown in Table 4. Although the $O_2$ TR and the rejection rate due to blocking of the obtained films were not quite as good as those of the film produced in Example 11, the characteristics were sufficiently satisfactory.

EXAMPLE 17

A laminate film was produced in the same manner as in Example 11 except that the matte layer was made of polypropylene containing 0.4% by weight of spherical silicone resin particles. The $O_2$ TR rejection ratio due to blocking and peel strength of the vapor-deposited Al layer of the obtained film are shown in Table 4. Although the $O_2$ TR and the rejection rate due to blocking of the obtained film were not quite as good as those of the film produced in Example 11, the characteristics were sufficiently satisfactory.

EXAMPLE 18

Figure 3:
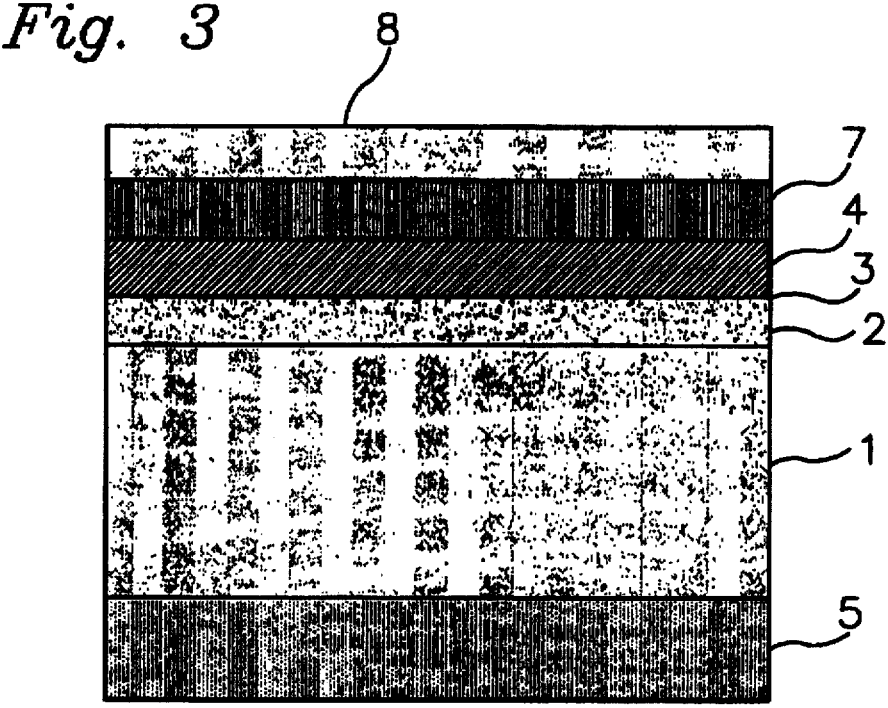
FIG. 3 is a schematic cross-sectional view of the polyolefin-based laminate film according to still another embodiment of the present invention.

On the surface of the vapor-deposited metal layer of the film produced in Example 1, polyethylene containing 3% by weight of ethylene methyl acrylate was extrusion-laminated at 280°–320° C. Simultaneously, on this laminated layer, a biaxially oriented polypropylene film having a thickness of 19 μm, whose one surface was printed, was laminated to obtain a composite film. A cross-sectional view of the thus obtained composite film is shown in FIG. 3. In FIG. 3, the same reference numbers as in FIG. 1 denote the same meanings as in FIG. 1. Reference number 7 denotes the polyethylene layer and reference number 8 denotes the polyolefin-based resin layer. The composite film according to this example had excellent moisture-proof and gas-barrier properties, the rejection rate was low and the film was able to be produced at a low cost.

EXAMPLE 19

Figure 4:
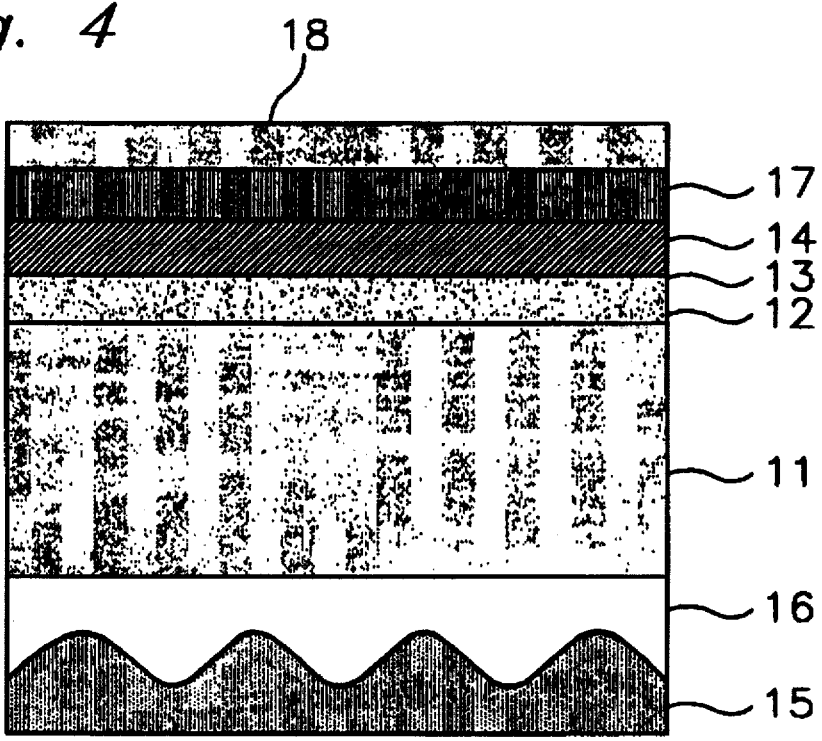
FIG. 4 is a schematic cross-sectional view of the polyolefin-based laminate film according to still another embodiment of the present invention.

On the surface of the vapor-deposited metal layer of the film produced in Example 11, polyethylene containing 3% by weight of ethylene methyl acrylate was extrusion-laminated at 280°–320° C. Simultaneously, on this laminated layer, a biaxially oriented polypropylene film having a thickness of 19 μm, whose one surface was printed, was laminated to obtain a composite film. A cross-sectional view of the thus obtained composite film is shown in FIG. 4. In FIG. 4, the same reference numbers as in FIG. 2 denote the same meanings as in FIG. 2. Reference number 17 denotes the polyethylene layer and reference number 18 denotes the polyolefin-based resin layer. The composite film according to this example had excellent moisture-proof and gas-barrier properties, the rejection rate was low and the film was able to be produced at a low cost.

4. The polyolefin-based laminate film according to claim 1 wherein said polyolefin-based mixed resin layer has a thickness of about 0.1–5.0 μm.

5. The polyolefin-based laminate film according to claim 1 wherein said polyolefin-based mixed resin layer contains crystalline polypropylene as a base resin.

6. The polyolefin-based laminate film according to claim 1 wherein said petroleum resin contains as a major component a cyclopentadiene series hydrocarbon or a higher olefinic hydrocarbon.

7. The polyolefin-based laminate film according to claim 1 wherein said terpene resin is dipentene or a mixture of dipentene and β-pinene.

8. The polyolefin-based laminate film according to claim 1 wherein the discharge treatment of said polyolefin-based mixed resin layer is performed in an atmosphere of $CO_2$ and/or $N_2$.

9. The polyolefin-based laminate film according to claim 1 wherein said vapor-deposited metal layer formed on the discharge-treated surface of said polyolefin-based mixed resin layer has a thickness of 5–60 nm.

10. The polyolefin-based laminate film according to claim 1 wherein said vapor-deposited metal layer formed on the discharge-treated surface of said polyolefin-based mixed resin layer is an aluminum layer.

11. The polyolefin-based laminate film according to claim 1 wherein said heat seal layer has a thickness of 0.5–5.0 μm.

TABLE 4

| | Thickness (μm) | | | Mixed Resin | Discharge Treatment | Discharge Treatment | $O_2$ TR | Rejection Rate due to | Peel Strength of Deposited | |
|---|---|---|---|---|---|---|---|---|---|---|
| | Layer A | Layer B | Layer C | (wt %) | of Matt Layer | of Layer A | $in^2$/day) | Blocking (%) | Al Layer (g/inch) | Note |
| Example 11 | 0.5 | 13.7 | 1.0 | 15 | *1 | *2 | 0.78 | 0.1 | 480 | |
| Example 12 | 0.5 | 13.7 | 1.0 | 15 | *1 | *1 | 0.96 | 0.3 | 360 | |
| Example 13 | 0.5 | 13.7 | 1.0 | 10 | *1 | *2 | 1.10 | 0.7 | 370 | |
| Example 14 | 0.5 | 13.7 | 1.0 | 25 | *1 | *2 | 0.79 | 0.2 | 540 | |
| Example 15 | 0.5 | 13.7 | 1.0 | 15 | *1 | *2 | 0.91 | 0.3 | 440 | |
| Example 16 | 0.5 | 13.7 | 1.0 | 15 | *1 | *2 | 1.14 | 0.6 | 410 | |
| Example 17 | 0.5 | 13.7 | 1.0 | 15 | *1 | *2 | 0.81 | 0.9 | 470 | |

*1: in the air
*2: $CO_2/N_2$ atmosphere

We claim:

1. A polyolefin-based laminate film including at least 4 layers comprising:

a polyolefin-based resin layer;

a polyolefin-based mixed resin layer formed on one surface of said polyolefin-based resin layer, said polyolefin-based mixed resin layer having a surface treated by a discharge treatment and said polyolefin-based mixed resin layer containing at least one component selected from the group consisting of petroleum resins and terpene resins in an amount of about 5–30% by weight;

a vapor-deposited metal layer formed on the discharge-treated surface of said polyolefin-based mixed resin layer; and a heat seal layer formed on the surface of said polyolefin-based resin film opposite said surface on which said polyolefin-based mixed resin layer is formed.

2. The polyolefin-based laminate film according to claim 1 wherein said polyolefin-based resin layer has a thickness of about 10–20 μm.

3. The polyolefin-based laminate film according to claim 1 wherein said polyolefin-based resin layer consists essentially of a polypropylene-based resin.

12. The polyolefin-based laminate film according to claim 11 or 21 wherein said heat seal layer contains an anti-blocking agent in an amount of about 0.05–0.5% by weight.

13. A polyolefin-based laminate film comprising:

a polyolefin-based resin layer;

a polyolefin-based mixed resin layer formed on one surface of said polyolefin-based resin layer, said polyolefin-based mixed resin layer having a surface treated by a discharge treatment and said polyolefin-based mixed resin layer containing at least one component selected from the group consisting of petroleum resins and terpene resins in an amount of about 5–30% by weight;

a vapor-deposited metal layer formed on the discharge-treated surface of said polyolefin-based mixed resin layer;

a heat seal layer formed on the surface of said polyolefin-based resin film opposite said surface on which said polyolefin-based mixed resin layer is formed; and an additional polyolefin-based resin layer between said polyolefin-based resin layer and said heat seal layer, said additional polyolefin-based resin layer having a surface being treated by discharge treatment.

14. The polyolefin-based laminate film according to claim 13, further comprising a polyethylene layer and a biaxially oriented polyolefin-based resin layer sequentially laminated on said vapor-deposited metal layer.

15. The polyolefin-based laminate film according to claim 13 wherein said additional polyolefin-based resin layer has a thickness of about 0.1–5.0 µm.

16. The polyolefin-based laminate film according to claim 15 or 13 wherein said additional polyolefin-based resin layer is a matte layer of a block copolymer of polypropylene and one or more other polymers whose surface is roughened during film formation step so as to matte said additional polyolefin-based resin layer.

17. The polyolefin-based laminate film according to claim 13 wherein said heat seal layer has a thickness of about 5–30 µm.

18. The polyolefin-based laminate film according to claim 1 which comprises polypropylene as a major component.

19. A wrapping film comprising:

a polyolefin-based resin layer;

a polyolefin-based mixed resin layer formed on one surface of said polyolefin-based resin layer, said polyolefin-based mixed resin layer having a surface treated by a discharge treatment and said polyolefin-based mixed resin layer containing at least one component selected from the group consisting of petroleum resins and terpene resins in an amount of about 5–30% by weight;

a vapor-deposited metal layer formed on the discharge-treated surface of said polyolefin-based mixed resin layer;

a heat seal layer formed on the surface of said polyolefin-based resin film opposite said surface on which said polyolefin-based mixed resin layer is formed;

a polyethylene layer formed on said vapor-deposited metal layer; and a biaxially oriented polyolefin-based resin layer formed on said polyethylene layer.

20. The wrapping film according to claim 19 further comprising an additional polyolefin-based resin layer between said polyolefin-based resin layer and said heat seal layer, the surface of said additional polyolefin-based resin layer being treated by discharge treatment.

21. A polyolefin-based laminate film including at least 4 layers comprising:

a polyolefin-based resin layer;

a polyolefin-based mixed resin layer formed on one surface of said polyolefin-based resin layer, said polyolefin-based mixed resin layer having a surface treated by a discharge treatment and said polyolefin-based mixed resin layer containing at least one component selected from the group consisting of petroleum resins and terpene resins in an amount of about 5–30% by weight;

a vapor-deposited metal layer formed on the discharge-treated surface of said polyolefin-based mixed resin layer; and a heat seal layer having a thickness of 0.5–5.0 µm and consisting essentially of a ternary ethylene/propylene/butene copolymer formed on the surface of said polyolefin-based resin film opposite said surface on which said polyolefin-based mixed resin layer is formed.

\* \* \* \* \*

UNITED STATES PATENT AND TRADEMARK OFFICE
CERTIFICATE OF CORRECTION

PATENT NO. : 5,698,317
DATED : December 16, 1997
INVENTOR(S) : Ken Kurokawa and Nobuo Suzui It is certified that error appears in the above-indentified patent and that said Letters Patent is hereby corrected as shown below:

In Column 7, line 25, please change "$[(L_0 - L_0)/L_0]$" to --$[(L_0 - L_1)/L_0]$--.

Signed and Sealed this

Seventeenth Day of March, 1998

Attest:

BRUCE LEHMAN

Attesting Officer    Commissioner of Patents and Trademarks